United States Patent Office 3,152,041
Patented Oct. 6, 1964

1

3,152,041
PIPERAZINE-BITHIONOL ANTHELMINTIC
James M. Gillingham, Indianola, and John C. Clark, Des Moines, Iowa, assignors, by mesne assignments, to Diamond Laboratories Inc., Des Moines, Iowa
No Drawing. Filed May 25, 1961, Ser. No. 112,533
8 Claims. (Cl. 167—53)

This invention relates to an anthelmintic.

Piperazine and some of its salts have been employed for the treatment of pinworm (enterobiasis) and roundworm (ascariasis) infestation. Sloan et al. in the J. Pharm. Pharmacol, vol. 6, p. 718 (1954) found piperazine adipate to be effective in animals against roundworms but ineffective against hookworms and tapeworms.

Bithionol has been used to treat tapeworm infections in animals (Am. J. Vet. Res., vol. 21, p. 628, 1960). This compound, however, is ineffective against any of the common gastrointestinal nematodes in animals.

It is an object of the present invention to prepare a compound having a greater spectrum of activity against the above described types of parasitic infections than either piperazine, its known salts or bithionol and its known salts.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

It has now been found that these objects can be attained by preparing piperazine-bithionol, a compound having the formula

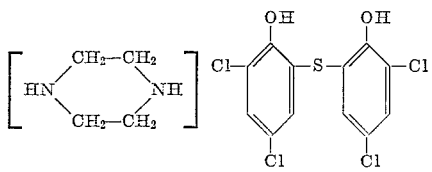

This compound can be prepared by mixing a solution of piperazine in acetone with an equimolar solution of bithionol in acetone. The resultant crystalline precipitate is separated from its mother liquor and dried.

While the piperazine and bithionol are preferably reacted in these proportions (which approximate 1 part piperazine to 4 parts bithionol by weight), it is possible to vary the ratios and to employ either compound in a molecular excess. Thus, for each part by weight of piperazine there could be anywhere from 0.2 to 10 parts of bithionol. In place of the free compounds salts thereof, e.g., piperazine citrate, piperazine adipate, piperazine hydrochloride or the sodium or potassium salts of bithionol can be employed to prepare the piperazine-bithionol. The resulting product has a wider spectrum of activity than either of its precursors.

Piperazine-bithionol can be precipitated from an aqueous alkaline solution of bithionol and piperazine upon the addition to acid, e.g., hydrochloric or sulfuric acid.

The compound is soluble in dimethyl formamide and higher aliphatic alcohols such as butyl alcohol but is insoluble in water and methyl alcohol.

2

The new compound has a melting point of 214–215° C. and a molecular weight of 442.21. The chemical characteristics of the compound were as follows:

ANALYSIS

|  | Theory | Found |
|---|---|---|
| C, percent | 43.45 | 43.46 |
| H, percent | 3.65 | 3.59 |
| N, percent | 6.34 | 6.26 |
| S, percent | 7.26 | 7.34 |

The piperazine-bithionol when dissolved in aqueous alkali exhibited the following ultra violet adsorption characteristics:

Maximum, $E_{1\ cm.}^{1\%}$ 236 at 327 m$\mu$

Minimum, $E_{1\ cm.}^{1\%}$ 58 at 285 m$\mu$

In contrast bithionol when similarly dissolved in the aqueous alkali had ultra violet adsorption values as follows:

Maximum, $E_{1\ cm.}^{1\%}$ 330 at 325 m$\mu$

Minimum, $E_{1\ cm.}^{1\%}$ 83 at 284 m$\mu$

The product has the following comparative toxicity.

Compound:                  $LD_{50}$ (in mice), mg./kg.
    Piperazine-bithionol _____ 800
    Piperazine citrate _____ 4000
    Bithionol _____ 3190
    Piperazine citrate-bithionol _____ 1007

It is not necessary to crystallize out the piperazine-bithionol (which can also be called piperazine-bithionolate) but instead, a mixture of piperazine and bithionol can be utilized in solution to give a satisfactory therapeutic.

Example 1

17.2 grams of piperazine anhydrous base (2 moles) was dissolved in 250 milliliters of acetone. 36.6 grams of bithionol (1 mole) was dissolved in 250 milliliters of acetone. The bithionol was added to the piperazine solution in 5 milliliter increments while mixing. Using a glass electrode pH electrometer, the pH prior to addition of the bithionol was 11.8 and crystals appeared at pH 10.5. After adding the remaining bithionol and mixing, crystallization of the compound occurred. Crystals were separated from filtrate and dried. A yield of 27 gm. of white crystalline compound with a melting point of 215° C. was obtained.

Example 2

8.6 gm. of piperazine was dissolved in 250 milliliters of acetone. 35.6 gm. of bithionol was dissolved in 250 milliliters of acetone. The piperazine solution was added to the bithionol solution in 5 milliliter increments while mixing. The pH of the bithionol solution prior to mixing was 3.3 with crystal formation starting at pH 5.6. Crystals were separated by filtration and dried. A yield of 18 gm. of large, slightly yellow crystals were obtained. Melting point was 214°–215° C.

Example 3

80 gm. of sodium hydroxide was dissolved in one liter of water. 356 gm. of bithionol was dissolved in the sodium hydroxide solution with continuous mixing. The bithionol-sodium hydroxide solution was then brought to a volume of two liters with water, and filtered.

180 gm. of anhydrous piperazine was dissolved in 1.5 liters of water.

The piperazine and bithionol solutions were mixed together and 450 milliliters of 5 N hydrochloric acid added. The crystals formed were separated by filtration and dried. A yield of 528 gm. was obtained having a melting point of 214°–215° C.

*Example 4*

40 gm. of the compound obtained from Example 3 was dissolved in 800 milliliters of normal butyl alcohol with heat. Solution was allowed to cool slowly producing a recrystallized compound. A yield of 35 gm. was obtained having a melting point of 214° to 215° C.

The piperazine-bithionol salt is a useful veterinary anthelmintic for a large variety of animals. It can be employed as a therapeutic for cats, dogs, pigs, cattle, sheep and horses. The salt can be administered in liquid form dissolved or dispersed in an appropriate solvent or it can be administered as a capsule, tablet or the like.

*Example 5*

0.5 gm. of piperazine-bithionol salt was filled into a size "0" gelatin capsule by any of the means known to the art, e.g., "hand-tamping" or filling with an automatic capsule filling machine. The salt can be mixed with oil or other suitable excipients and filled into soft (elastic) capsules. Oher active ingredients can be added if desired.

*Example 6*

Two hundred grams of the piperazine-bithionol were mixed with thirty grams of corn starch and twenty grams of lactose. The mixture was granulated thoroughly with a 5% starch paste. The granulation was forced through an 8 mesh screen and dried. The granulated product was then passed through a 16 mesh screen and lubricated by the addition of 3 gm. of corn starch, 1 gm. of talcum, and 1 gm. of magnesium stearate. The mixture was then compressed to make a tablet or bolus of suitable size to contain from 100 mg. to 20 gm. of active piperazine-bithionol salt. Tablet or bolus size is determined by the intended use of the final dosage form. Small tablets are suitable for small animals, while the boluses are used for treatment of large animals.

*Example 7*

To make a suspension, 150 gm. of piperazine-bithionol compound were suspended in a base consisting of the following:

| | |
|---|---|
| Sodium carboxymethylcellulose | gm 10 |
| Veegum (a dextrin gum) | gm 10 |
| Sugar | gm 100 |
| Methyl p-aminobenzoate | gm 1.8 |
| Propyl p-aminobenzoate | gm 0.2 |
| Propylene glycol | ml 50 |

Water, q.s. 1000 ml.
Flavor to taste.

The resultant suspension contained 150 mg. of active ingredient (piperazine-bithionol compound) per ml.

*Example 8*

An oil base suspension was made by adding 150 gm. of piperazine-bithionol compound to a warm solution consisting of:

| | Gm. |
|---|---|
| Petrolatum | 700 |
| Cod liver oil | 100 |

Mineral oil, q.s. 1000 ml.

Upon cooling, the paste was filled into suitable dispensing containers, for easy dosing of cats or other small animals.

*Example 9*

Since the compound is essentially tasteless, odorless, and stable in powder form, it can be administered in its crystalline form, or may be added to feeds or admixed with flavors, and excipients to provide the proper concentration for treatment.

The compound can also be administered together with other suitable active ingredients in any of the above described dosage forms as deemed necessary to provide a suitable and efficacious treatment of parasitic infections.

Toxicity studies were also run on cats. An oral suspension was prepared containing 0.5 gm. of piperazine-bithionol compound per milliliter and filled into plastic disposable dosing syringes. Two cats were treated with ten times the normal dose without adverse effects. The cats received 1.5 gms. of the compound per pound of bodyweight, although the normal therapeutic dose is only 150 mg. per pound of bodyweight.

In another experiment capsules were made to contain 0.5 gram of piperazine-bithionol. 3 capsules per pound of bodyweight were fed to three different cats. This dosage was 10 times the therapeutic dose. Two of the cats had fecal softening and a very slight tranquilization was noted but otherwise none of the cats were adversely affected by the overdose.

To demonstrate the therapeutic value of the piperazine-bithionol salt it was administered to cats and dogs which were previously determined to be parasitized. Pretreatment and post-treatment egg counts were made by the Stoll dilution technique. Egg counts were made one week following treatment and the total fecal output for 48 hours' post-treatment was sieved in order to count the parasites passed.

The dosage of piperazine-bithionol administered to the animals was 150 mg. per lb. bodyweight.

The piperazine-bithionol salt decreased ascarid infections markedly. An egg reduction of 100% in the case of the dogs tested and 91% in the case of the cats tested was noted.

There was also noted a 70% egg reduction in one cat which had hookworms (*ancylostoma caninum*).

What is claimed is:
1. Piperazine-bithionol salt.
2. A therapeutic composition comprising an effective amount of a piperazine-bithionol salt and a nontoxic carrier therefor.
3. A method of treating an animal for internal helminths comprising orally administering to the animal piperazine-bithionol.
4. A method of making piperazine-bithionol salt comprising mixing piperazine and bithionol in the presence of acetone.
5. An anthelmintic composition comprising piperazine-bithionol salt in an effective amount and a nontoxic liquid carrier therefor.
6. A composition according to claim 5 wherein the carrier is an aqueous carrier.
7. A composition according to claim 5 wherein the carrier is an oil.
8. An anthelmintic composition comprising piperazine-bithionol salt in an effective amount and a nontoxic carbohydrate carrier therefor, said carbohydrate being selected from the group consisting of starch and sugar.

References Cited in the file of this patent

UNITED STATES PATENTS

| 2,033,495 | Taylor et al. | Mar. 10, 1936 |
| 2,646,382 | Craige | July 21, 1953 |
| 2,901,481 | Fusco et al. | Aug. 25, 1959 |
| 2,901,482 | MacKenzie et al. | Aug. 25, 1959 |

FOREIGN PATENTS

| 761,034 | Great Britain | Nov. 29, 1954 |